United States Patent
Rieber

(10) Patent No.: US 11,787,128 B2
(45) Date of Patent: Oct. 17, 2023

(54) METHOD FOR PRODUCING A FIBER-REINFORCED PLASTIC OUTER SKIN COMPONENT FOR A VEHICLE, AND FIBER-REINFORCED PLASTIC OUTER SKIN COMPONENT

(71) Applicant: Bayerische Motoren Werke Aktiengesellschaft, Munich (DE)

(72) Inventor: Gunnar Rieber, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 348 days.

(21) Appl. No.: 16/837,842

(22) Filed: Apr. 1, 2020

(65) Prior Publication Data

US 2020/0223157 A1 Jul. 16, 2020

Related U.S. Application Data

(63) Continuation of application No. PCT/EP2018/073610, filed on Sep. 3, 2018.

(30) Foreign Application Priority Data

Oct. 6, 2017 (DE) ..................... 10 2017 217 777.2

(51) Int. Cl.
*B29C 70/02* (2006.01)
*B29C 70/48* (2006.01)
(Continued)

(52) U.S. Cl.
CPC ............ *B29C 70/025* (2013.01); *B29C 70/48* (2013.01); *B32B 5/26* (2013.01); *C08J 5/243* (2021.05);
(Continued)

(58) Field of Classification Search
CPC ................ B32B 5/26; B32B 2260/021; B32B 2260/046; B32B 2262/106; B32B 2264/102; C08J 5/243
See application file for complete search history.

(56) References Cited

U.S. PATENT DOCUMENTS

2015/0115505 A1* 4/2015 Jones .................... B29C 70/467
264/511

FOREIGN PATENT DOCUMENTS

DE 10 2005 000 683 A1 3/2006
DE 10 2011 012 143 A1 8/2012
(Continued)

OTHER PUBLICATIONS

Chinese Office Action issued in Chinese application No. 201880053129.5 dated Apr. 1, 2021, with English translation (Sixteen (16) pages).
(Continued)

*Primary Examiner* — David Sample
*Assistant Examiner* — Donald M Flores, Jr.
(74) *Attorney, Agent, or Firm* — Crowell & Moring LLP

(57) ABSTRACT

A method for producing a fiber-reinforced plastic outer skin component for a vehicle includes the following steps: a) providing a semifinished fiber product which includes at least one fiber layer with predetermined fiber orientation; b) applying an uncured plastic matrix in the form of an epoxy resin-based or polyurethane-based matrix system to the semifinished fiber product; c) placing the semifinished fiber product provided with plastic matrix into a mold; and d) pressing the semifinished fiber product in the mold in order to shape and cure the semifinished fiber product to form a fiber-reinforced plastic component. A shrinkage-reducing additive in the form of filler particles is admixed with the uncured plastic matrix and the uncured plastic matrix is (Continued)

applied to the surface of the semifinished fiber product that in the finished component faces the visible side of the component.

5 Claims, 2 Drawing Sheets

(51) Int. Cl.
*B32B 5/26* (2006.01)
*C08J 5/24* (2006.01)
*B29K 63/00* (2006.01)
*B29K 75/00* (2006.01)
*B29K 307/04* (2006.01)
*B29K 509/00* (2006.01)
*B29L 31/30* (2006.01)

(52) U.S. Cl.
CPC ...... *B29K 2063/00* (2013.01); *B29K 2075/00* (2013.01); *B29K 2307/04* (2013.01); *B29K 2509/00* (2013.01); *B29L 2031/3005* (2013.01); *B32B 2260/021* (2013.01); *B32B 2260/046* (2013.01); *B32B 2262/106* (2013.01); *B32B 2264/102* (2013.01); *B32B 2307/412* (2013.01)

(56) References Cited

FOREIGN PATENT DOCUMENTS

| DE | 10 2011 109 724 A1 | 2/2013 |
| EP | 2 447 050 A1 | 5/2012 |
| EP | 2 855 123 B1 | 4/2015 |
| WO | WO 2016/102455 A1 | 6/2016 |

OTHER PUBLICATIONS

PCT/EP2018/073610, International Search Report dated Nov. 27, 2018 (Two (2) pages).
German Search Report issued in German counterpart application No. 10 2017 217 777.2 dated Feb. 27, 2018, with Statement of Relevancy (Eight (8) pages).

* cited by examiner

METHOD FOR PRODUCING A FIBER-REINFORCED PLASTIC OUTER SKIN COMPONENT FOR A VEHICLE, AND FIBER-REINFORCED PLASTIC OUTER SKIN COMPONENT

CROSS REFERENCE TO RELATED APPLICATIONS

This application is a continuation of PCT International Application No. PCT/EP2018/073610, filed Sep. 3, 2018, which claims priority under 35 U.S.C. § 119 from German Patent Application No. 10 2017 217 777.2, filed Oct. 6, 2017, the entire disclosures of which are herein expressly incorporated by reference.

BACKGROUND AND SUMMARY OF THE INVENTION

The invention relates to a process for the production of a fiber-reinforced plastics outer-paneling component for a vehicle, and also to a fiber-reinforced plastics outer-paneling component.

Fiber-reinforced plastics components are increasingly used in vehicle construction for lightweight construction purposes. Fiber-reinforced plastics components comprise fiber reinforcement embedded into a plastics matrix. Selection of suitable fibers and matrix systems permits production of components which have high strength together with low weight, for example through use of reinforcement systems made of carbon fibers embedded into a thermoset matrix made of epoxy resin or polyurethane. Fiber-reinforced plastics components not only have the lightweight construction advantages described but also provide access to particular design possibilities. If the fiber-reinforced components are configured with optical properties suitable for visible components, i.e., if the fiber reinforcement remains visible from a visible side of the component, it then becomes possible to achieve particular optical effects on the vehicle and to provide eye-catching features.

The fiber reinforcement usually consists of a plurality of fiber plies in mutually superposed layers. In order to achieve high component stability, at least one of the fiber plies usually has a predetermined fiber orientation. These directional reinforcement fibers are provided by way of example in the form of woven fabrics, laid scrims or braided fabrics.

Fiber-reinforced plastics components can be produced by way of example by the wet compression process or by the resin-transfer (RTM) process. In the case of wet compression, the fiber reinforcement is provided in the form of dry semifinished products, where the individual fiber plies forming the semifinished fiber product have already been mutually superposed in layers. The uncured, still flowable, plastics matrix is applied to the semifinished fiber product, which is inserted into a mold. The mold usually consists of two mold parts which in the closed state enclose a cavity in the shape of the required component. The mold is closed by way of example by a press; the semifinished fiber product saturated with the plastics matrix is thus forced into the cavity. The fiber stack is compressed, and the plastics matrix is distributed in the cavity. The mold is heated to harden the plastics matrix. After expiry of the required hardening time in the closed mold, the mold is opened, and the fiber-reinforced component can be removed. In the case of production by the RTM process, the dry semifinished product is introduced into the cavity of an RTM mold. The matrix material is injected into the closed RTM mold, where it becomes distributed within the cavity and infiltrates the semifinished fiber product. The component remains in the closed and heated RTM mold until hardening has been completed; it can then be removed.

Particularly stringent requirements are placed upon the surfaces of outer-paneling components of motor vehicles (known as class A surfaces). In particular, the surfaces of the outer-paneling components are intended to have uniform reflection properties. However, the chemical reaction causes shrinkage of the material during hardening of the matrix system both in the wet-compression process and in the RTM process. The component surface can consequently replicate the structure of the fiber reinforcement located therebelow, the surface therefore exhibiting, for example, corrugations or stripes. The production of paintable class A surfaces then requires complicated downstream operations, for example repeated filling and polishing; production of fiber-reinforced outer-paneling components consequently requires additional operations, and is expensive and comparatively slow.

It is therefore an object of the present invention to provide a possibility for production of a fiber-reinforced plastics outer-paneling component where the disadvantages mentioned are reduced or even avoided. In particular, it is an object of the invention to provide a solution that can, in a simple and inexpensive manner, improve production of a fiber-reinforced plastics outer-paneling component, a particular intention here being to reduce production times.

A process is provided for the production of a fiber-reinforced plastics outer-paneling component for a motor vehicle. The process comprises the steps of:

a) provision of a semifinished fiber product which comprises at least one fiber ply with predetermined fiber orientation, b) application of an uncured plastics matrix in the form of an epoxy-resin-based or polyurethane-based matrix system to the semifinished fiber product, c) insertion of the semifinished fiber product comprising plastics matrix into a mold, and d) pressing of the semifinished fiber product in the mold for shaping and for hardening to give a fiber-reinforced plastics component.

According to the invention, a shrinkage-reducing addition in the form of filler particles is added to the uncured plastics matrix, and the uncured plastics matrix is applied to that surface of the semifinished fiber product that, in the finished component, faces toward the visible side of the component.

The invention moreover provides, for a motor vehicle, a fiber-reinforced plastics outer-paneling component with fiber reinforcement which comprises at least one fiber ply with predetermined fiber direction, and with a plastics matrix into which the fiber reinforcement has been embedded, where the plastics matrix is an epoxy-resin matrix or a polyurethane matrix, and comprises filler particles at least on that side of the fiber reinforcement that faces toward the visible side.

The fiber-reinforced plastics outer-paneling component can in particular be produced by the process described above. Features and measures described in relation to the process and in relation to the outer-paneling component are therefore correspondingly valid reciprocally both for the process and for the component.

The process takes the form of a wet-compression process. When the molds required for this purpose are compared with, for example, RTM molds, they have a simpler structure and are less expensive. The plastics matrix is applied outside of the mold; residence time in the mold is therefore short. The use of shrinkage-reducing fillers on the subsequent visible side of the component moreover permits further reduction of cycle time. In this respect, the invention proceeds from the following rationale: shrinkage of the material occurs during hardening by virtue of the chemical reaction in the matrix material and is inter alia dependent on the temperature at which hardening takes place. Simply expressed: shrinkage increases as hardening temperature increases. If the tendency of the matrix material toward shrinkage is then reduced (via addition of the filler particles), the conclusion is conversely that mold temperature can be increased without any adverse effect on the surface quality of the component. In this respect, the invention makes use of the fact that even slight increases of mold temperature lead to significantly accelerated hardening. Times required in the closed mold can be significantly reduced; total process times can thus be reduced.

In order to reduce shrinkage on the subsequently important visible side of the component, the plastics matrix comprising filler is applied to that side of the fiber reinforcement that faces toward the subsequent visible side.

In step b) of the process, it is possible that the plastics matrix comprising the shrinkage-reducing addition is applied directly to the semifinished fiber product. In other words, a plastics matrix which already comprises the shrinkage-reducing filler particles is applied directly to the semifinished fiber product. By virtue of the pressure in the mold, the matrix material flows at least to some extent in between the fibers of the semifinished fiber product. The shrinkage-reducing particles here are to some extent retained at the surface of the semifinished fiber product—in a manner similar to the formation of the filter cake on a filter. Surprisingly, it has been found that this caking does not result in any significant noticeable adverse effect on the penetration of the semifinished fiber product by matrix material, and that adequate fiber adhesion can be achieved. This may be attributable to the fact that the flow distances required from the matrix material within the semifinished fiber product during the wet compression process are short—e.g., in comparison with the RTM process. The caking at the upper side of the semifinished fiber product can actually be advantageous, in that the retention of shrinkage-reducing particles increases their concentration at the upper side of the semifinished fiber product, and the shrinkage-reducing effect is therefore in particular produced where shrinkage of the material would affect the surface of the component in a particularly adverse manner.

It is alternatively possible in step b) that a first portion of the uncured plastics matrix which is free from the shrinkage-reducing addition is firstly applied directly to the semifinished fiber product, and that a second portion of the plastics matrix, comprising the shrinkage-reducing addition, is then applied. In other words, divided application of the matrix material takes place: one portion of the matrix material, without shrinkage-reducing fillers, is applied directly to the semifinished fiber product, and then the second portion of the matrix material, to which the shrinkage-reducing particles have been admixed, is then applied to the previously applied matrix material. It is preferable that the plastics matrix in each case, i.e., both the portion with and the portion without shrinkage-reducing particles, is applied to a substantial area of the semifinished fiber product. In the first portion applied there are no filler particles present that could retard infiltration of the fibers. In particular in the case of very high fiber content by volume and of compact semifinished fiber products with high density, it is possible to achieve improved penetration of the fibers with plastics matrix. When the second portion is then applied, the shrinkage-reducing particles are specifically applied where they are required, namely on that upper side of the semifinished fiber product that forms the visible side in the finished component. Because, by virtue of the first portion applied, the semifinished fiber product has already been infiltrated by matrix material, the flow distances required during the subsequent compression procedure from the plastics matrix of the second portion applied are then not large. The proportion of shrinkage-reducing particles in the second portion can therefore be optimized in respect of shrinkage-reducing effect.

The unhardened matrix material is an epoxy-resin-based matrix system or a polyurethane-based matrix system. The epoxy-resin-based matrix system comprises an epoxy resin as reactive resin and also one or more suitable hardener components which can crosslink with the epoxy resin to give a molded thermoset material. The term epoxy matrix is used in this application for the epoxy-based matrix system in the hardened state. The polyurethane-based matrix system comprises polyols and polyisocyanates, which react to give polyurethanes. The term polyurethane matrix is used in this application for the polyurethane-based matrix system in the hardened state. There can be further constituents added to the matrix systems, examples being accelerators. The use of epoxy-resin-based matrix systems or of polyurethane-based matrix systems is an advantageous choice for components subject to high loads because, unlike polyester resins for example, these resin systems have the required mechanical properties and adequate resistance to chemicals, and also low water absorption. Epoxy resin in particular has excellent adhesion properties, and features strong fiber adhesion.

Materials suitable in principle as shrinkage-reducing additive are any filler particles that can discernibly reduce the tendency of the plastics matrix toward shrinkage. The term fillers is intended in particular to mean finely divided substances in granular form or powder form which are insoluble in the plastics matrix system.

If electrically conductive fillers are used, e.g., carbon black particles, further advantages can be achieved. Conventional carbon-fiber-reinforced components exhibit non-uniform uptake of coatings in downstream CEC processes. Use of electrically conductive fillers in the plastics matrix improves the electrical conductivity of the component and improves uptake of coating during cathodic electrocoating. It becomes possible to omit complicated additional processes that were previously required, for example use of additional plastics layers or textile plies, or internal coating of the mold.

Surprisingly, it has now been found that use of particles from the group of talc, spodumene and/or fumed silicon dioxide as shrinkage-reducing addition can achieve good shrinkage reduction without any significant reduction of transparency of the matrix material. Fumed silicon dioxide is known by way of example with the trademark Aerosil®. Through the use of these filler particles it also, and specifically, becomes possible to produce fiber-reinforced plastics components rapidly and inexpensively with optical properties suitable for visible components. In one embodiment, the fiber-reinforced plastics component can therefore be a component with optical properties suitable for visible components where the fiber reinforcement is visible on the visible side of the component through the plastics material, where the plastics material comprises particles from the group of talc, spodumene and/or fumed silicon dioxide.

In one embodiment, the maximum size of the particles of the shrinkage-reducing addition is advantageously 0.1 mm (millimeter). Particles with size not significantly exceeding 0.1 mm bring about good shrinkage reduction without themselves causing residual irregularities on the surface of the component. In particular, good infiltration of the semifinished fiber product by the plastics matrix can still be observed when such particles are used. Nanoparticles are particularly suitable, an example being silicon dioxide.

The quantitative proportion of the shrinkage-reducing addition added to the plastics matrix can vary, by way of example depending on the nature, size and/or size distribution of the particles and on the structure of the semifinished fiber product. The quantitative proportion is in principle selected in a manner that retains adequate fiber-matrix coupling. It is possible by way of example to achieve good shrinkage reduction and resultant possible increase of mold temperature in an embodiment where the shrinkage-reducing addition in the form of filler particles makes up at most 40% by weight (percent by weight), based on the unhardened plastics matrix. After hardening, the mold is opened in a subsequent step e), and the fiber-reinforced plastics component is removed. Further operations can follow.

The semifinished fiber product preferably comprises at least one fiber ply of continuous fibers. Fibers termed continuous fibers in this context are those with length above 50 mm, and in particular fibers which extend over an entirety of a lateral dimension of the component, e.g., the length or width of the component. Use of continuous fibers can achieve high stiffness values and strength values in the component.

The semifinished fiber product is preferably composed of a layer arrangement of a plurality of fiber plies (known as stack). The individual fiber plies can be configured as plies with predetermined fiber position and can by way of example be configured as laid scrim (uni- or biaxial), woven fabric or braided fabric. The fiber reinforcement can equally also additionally comprise one or more plies of unoriented fibers, e.g., in the form of fibrous nonwoven web plies.

For achievement of the required component properties for the use as vehicle component, the semifinished fiber product can advantageously comprise a plurality of fiber plies which are made of continuous fibers and which are mutually superposed in layers.

Suitable reinforcement fibers are in principle the known reinforcement fibers, for example carbon, glass fibers or aramid fibers. However, in respect of the requirements in a vehicle, the semifinished fiber product advantageously comprises carbon fibers and by way of example comprises at least one fiber ply, preferably a plurality of fiber plies, with reinforcement fibers made of carbon.

The semifinished fiber product used in the process forms the fiber reinforcement in the finished component; the statements made in relation to the semifinished fiber product are therefore also valid for the fiber reinforcement.

The fiber-reinforced plastics component is used in the outer-paneling region of a motor vehicle, and can by way of example be a flap, a door, or else a structural component, e.g., a vehicle roof. In particular, the process described is suitable for production of high-strength components with a proportion of fiber by volume of, for example, more than 30% by volume (percent by volume) and up to 50% by volume. Such components can by way of example be structural components in vehicle bodywork, and the process therefore also permits production of structural components with fiber reinforcement with optical properties suitable for visible components. However, the process described is equally suitable for production of fiber-reinforced plastics components used in the interior region of a vehicle, e.g., as visible CRP components in the interior of a vehicle.

Other advantages, features and details of the invention can be found in the description below, where embodiments of the invention are described in detail with reference to the drawings. Each of the features mentioned in the claims and in the description can be significant for the invention individually per se or in any desired combination. When the word "can" is used in this application, it refers either to a technical possibility or to an actual technical feature.

Embodiments are explained below with reference to the attached drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
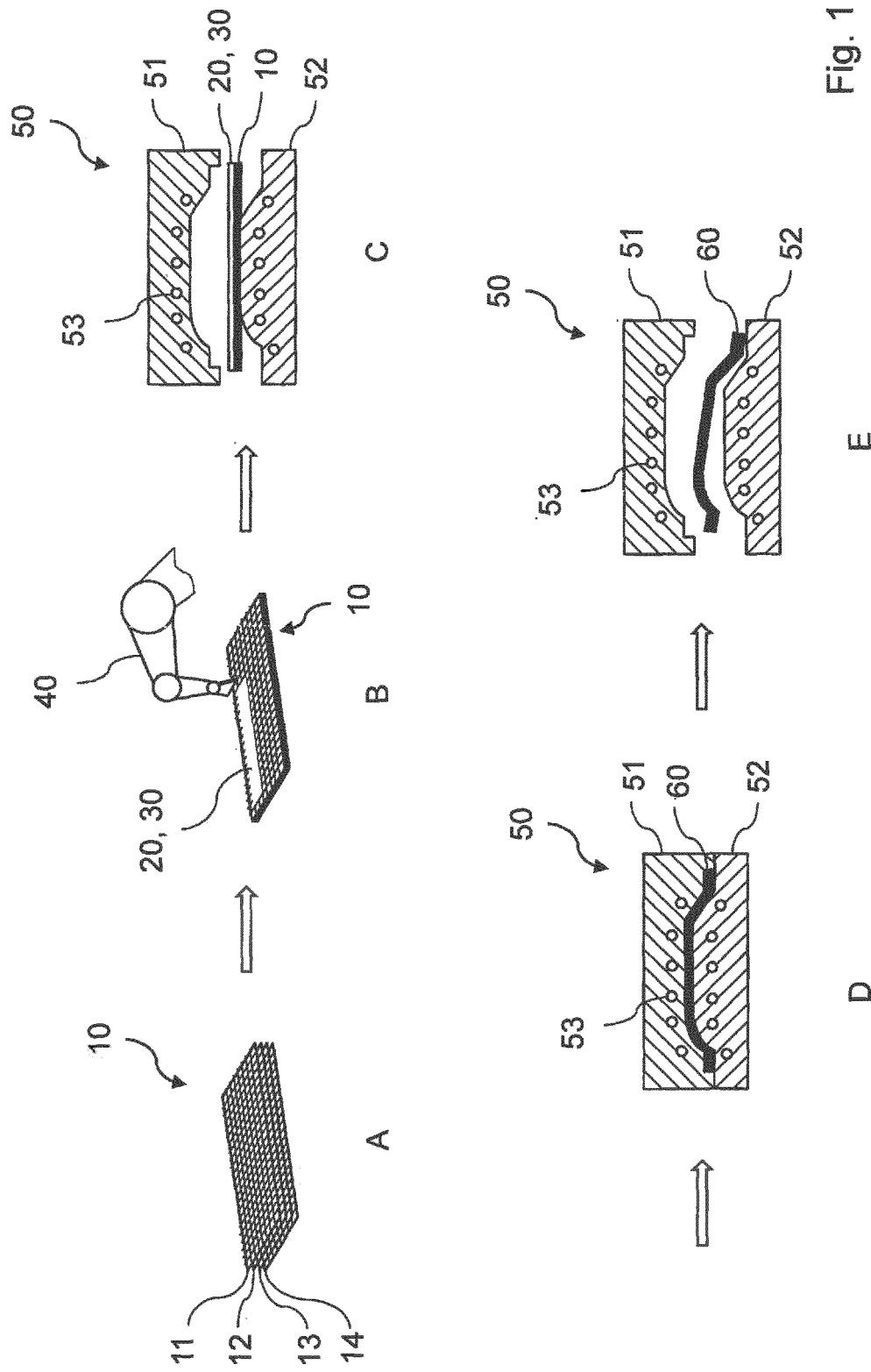
FIG. 1 is a diagram of the significant steps of a process of the invention.

FIG. 1 is a diagram of the significant steps of a process of the invention for the production of a fiber-reinforced plastics component for the example of a CRP roof with optical properties suitable for visible components, where A indicates step a), B indicates step b), C indicates step c), D indicates step d) and E indicates step e).

In step a), a semifinished fiber product 10 is provided. The semifinished fiber product 10 is formed by at least one fiber ply of reinforcement fibers. It is preferable that the semifinished fiber product 10 is configured by mutually superposing a plurality of fiber plies in the form of stack; by way of example, FIG. 1 depicts 4 fiber plies 11 to 14 in the form of stack. At least one of the fiber plies has a predetermined fiber orientation, as is the case by way of example in laid scrims, woven fabrics or braided fabrics. Different fiber plies can be combined with one another in the stack. Equally, individual fiber plies can be configured as fibrous nonwoven web. The nature of the fibers is not in principle subject to any restriction. However, it is preferable that the semifinished fiber product comprises one or more fiber plies comprising continuous carbon fibers.

The semifinished fiber product 10 can by way of example take the form of cut-to-size product with outline already replicating the general shape of the required component.

In step b), an uncured plastics matrix 20 is applied to the semifinished fiber product 10. An epoxy-resin based matrix system or a polyurethane-based matrix system is used as plastics matrix.

In order to reduce shrinkage arising during hardening, an addition 30 in the form of filler particles is added to the plastics matrix 20 of the invention. If the required component is intended to be a component with optical properties suitable for visible components, the filler particles are selected from the group of talc, spodumene and fumed silicon dioxide. The size of the particles is preferably at most 0.1 mm, their concentration in the uncured plastics matrix being at most 40% by weight.

Figure 2A:
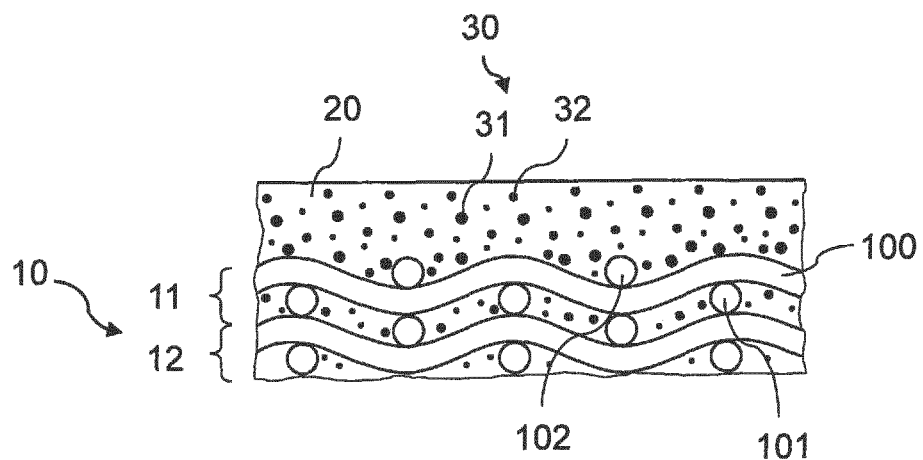
FIG. 2A is a sectional view, after step B in a first version of the process, of a semifinished fiber product to which matrix material has been applied.
Figure 2B:
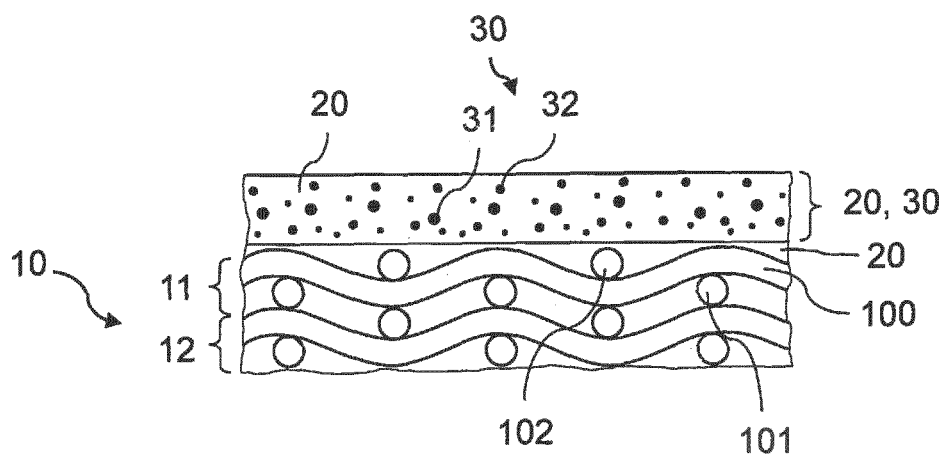
FIG. 2B is a sectional view, after step B in a second version of the process, of a semifinished fiber product to which matrix material has been applied.

The plastics matrix 20 comprising the shrinking-reducing addition 30 is applied to a large area of the semifinished fiber product 10, e.g., via a robot-guided applicator 40. The material can be applied directly to the semifinished fiber product 10; FIG. 2A provides relevant detail. Alternatively, the plastics matrix 20 can be applied in a two-stage process. FIG. 2B provides relevant detail.

After step b), the semifinished fiber product 10 comprising the plastics matrix 20 and comprising the shrinkage-reducing addition 30 is inserted into a mold 50 in step c). The mold has two mold halves 51 and 52 which when closed enclose a cavity that in essence has the shape of the required fiber-reinforced plastic component. The mold 50 can be closed by way of an actuator that is not depicted. The actuator can by way of example be configured as press. When the mold 50 is closed (step d), the semifinished fiber product 10 is forced into the shape of the cavity, after which it is compressed. The closing pressure distributes the plastics matrix 20 in the cavity, and the matrix is also further forced here into the interstices between the fibers.

The mold 50 is heated in order to harden the plastics matrix 20; for this purpose, by way of example, heating tubes 53 are provided. After hardening, the fiber-reinforced plastics component 60 can be removed from the mold 50, depicted in step e), and can optionally then be introduced into further operations.

FIGS. 2A and 2B serve to provide detail of two alternative versions of a process in step b). Each of FIGS. 2A and 2B is a diagrammatic sectional depiction of the semifinished fiber product 10, showing only two fiber plies 11 and 12 of the stack. The respective fiber plies are configured as woven fabric comprising a large number of carbon fiber bundles; (fiber bundles 100, 101, 102 are designated merely by way of example). The fiber ply 11 is intended to be the first fiber ply in the finished component (view from the visible side of the component), and to be visible through the plastics matrix.

In FIG. 2A, a shrinkage-reducing addition 30 as described above is added to the plastics matrix 20, and the plastics matrix 20, with the addition 30, is applied directly to the uppermost fiber ply 11 of the semifinished fiber product 10. During subsequent compression in the mold, the plastics matrix 20 is forced between the fibers or fiber strands, and infiltrates the interstices. The solid particles 31, 32 (for reasons of clarity only two particles are provided with reference signs) of the shrinkage-reducing addition 30 migrate only to some extent between the fibers or fiber bundles 100, 101, 102, and to some extent are retained at the upper side of the semifinished fiber product 10, and are deposited thereon. This advantageously leads to an increased proportion of shrinkage-reducing particles specifically at the surface of the semifinished fiber product 10, where the intention is to avoid shrinkage during hardening.

FIG. 2B is a sectional depiction of the fiber plies 11 and 12 of the semifinished fiber product 10 after the plastics matrix 20 has been applied in an alternative version of the process in a two-stage step b). A first portion of the plastics matrix 20 without shrinkage-reducing addition 30 was first applied to the upper side of the semifinished fiber product 10, i.e., directly to the uppermost or first fiber ply 11. In a second application, the second portion of the plastics matrix 20 with added shrinkage-reducing addition 30 is then applied on top of the previously applied plastics matrix 20. This two-layer application brings about better infiltration of the fiber interstices by plastics matrix 20 during subsequent compression in the mold.

In both versions of the process, shrinkage-reducing particles 31, 32, which reduce shrinkage during hardening, remain on the upper side of the semifinished fiber product 10 or on the uppermost fiber ply 11; this in principle improves surface quality, and it is moreover possible to increase the mold temperature to temperatures at which it was not hitherto possible to achieve acceptable surface quality. It is thus possible to achieve a large reduction of residence time in the mold 50 and to reduce the total production time of the component 60 in an easy and inexpensive manner.

Figure 3:
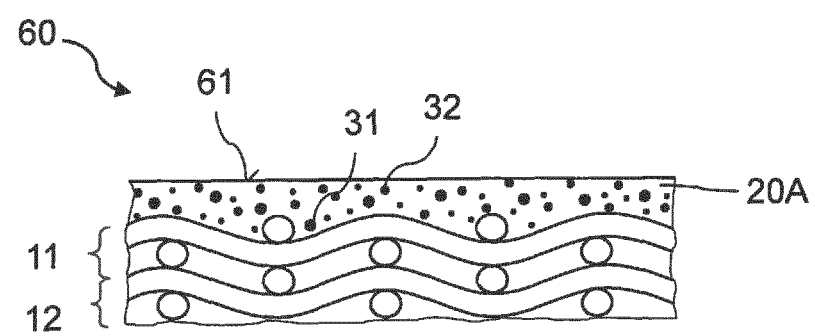
FIG. 3 is a sectional view of a fiber-reinforced plastics outer-paneling component.

FIG. 3 is a diagrammatic sectional view of the fiber-reinforced plastics outer-paneling component 60 after hardening. The fiber reinforcement 10 has been embedded into the hardened plastics matrix 20A. The hardened plastics matrix 20A comprises the shrinkage-reducing addition 30; filler particles 31, 32 are arranged here at least on that side of the fiber reinforcement 10 that faces toward the visible side 61, i.e., on the uppermost fiber ply 11.

The embodiments are not to scale, and are not restrictive. Modifications are possible within the scope of activity of a person of ordinary skill in the art.

LIST OF REFERENCE CHARACTERS

A, B, C, D, E Process steps
10 Semifinished fiber product
11 to 14 Fiber plies
100, 101, 102 Fiber strands
20 Uncured plastics matrix
20A Hardened plastics matrix
30 Shrinkage-reducing addition
31, 32 Filler particle
40 Applicator
50 Mold
51, 52 Mold halves
53 Heating tubes
60 Fiber-reinforced plastics component
61 Visible side The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fiber-reinforced plastics outer-paneling component for a motor vehicle, comprising:
   a fiber reinforcement which comprises at least one fiber ply with a predetermined fiber orientation;
   a plastics matrix which is applied to the fiber reinforcement;
   wherein the plastics matrix is an epoxy-resin matrix or a polyurethane matrix; and
   shrinkage-reducing filler particles disposed in the plastics matrix, wherein a size of the shrinkage-reducing filler particles is at most 0.1 millimeters and wherein the shrinkage-reducing filler particles are particles of spodumene and/or fumed silicon dioxide;
   wherein a first portion of the plastics matrix that does not contain the shrinkage-reducing filler particles is applied directly to a side of the fiber reinforcement that faces toward a visible side of the fiber-reinforced plastics outer-paneling component and wherein a second portion of the plastics matrix that contains the shrinkage-reducing filler particles is applied to the first portion of the plastics matrix.

2. The fiber-reinforced plastics outer-paneling component according to claim 1, wherein the at least one fiber ply is comprised of continuous fibers.

3. The fiber-reinforced plastics outer-paneling component according to claim 1, wherein the fiber reinforcement comprises carbon fibers.

4. The fiber-reinforced plastics outer-paneling component according to claim 1, wherein the fiber reinforcement is visible on the visible side of the fiber-reinforced plastics outer-paneling component through the plastics matrix.

5. A method for production of a fiber-reinforced plastics outer-paneling component for a vehicle, comprising the acts of:
- a) providing a semifinished fiber product which comprises at least one fiber ply with a predetermined fiber orientation;
- b) applying an uncured plastics matrix in a form of an epoxy-resin-based or polyurethane-based matrix system to the semifinished fiber product, wherein a shrinkage-reducing addition in a form of filler particles is added to the uncured plastics matrix;
- c) inserting the semifinished fiber product with the uncured plastics matrix into a mold; and
- d) pressing of the semifinished fiber product in the mold for shaping and for hardening to produce the fiber-reinforced plastics outer-paneling component;

wherein the uncured plastics matrix is applied to a surface of the semifinished fiber product that faces toward a visible side of the fiber-reinforced plastics outer-paneling component;

wherein in act b) a first portion of the uncured plastics matrix that does not contain the shrinkage-reducing addition is first applied directly to the semifinished fiber product followed by applying a second portion of the uncured plastics matrix that contains the shrinkage-reducing addition to the first portion;

wherein the shrinkage-reducing filler particles reduce shrinkage during hardening of the plastics matrix in the mold, wherein a size of the shrinkage-reducing filler particles is at most 0.1 millimeters and a concentration of the shrinkage-reducing filler materials in the plastics matrix when uncured is at most 40% by weight, and wherein the shrinkage-reducing filler particles are particles of spodumene and/or fumed silicon dioxide;

wherein the first portion of the uncured plastics matrix that does not contain the shrinkage-reducing filler particles is applied to the surface of the semifinished fiber product that faces toward the visible side of the fiber-reinforced plastics outer-paneling component.

* * * * *